United States Patent
Kuo et al.

(10) Patent No.: US 11,587,551 B2
(45) Date of Patent: Feb. 21, 2023

(54) LEVERAGING UNPAIRED TEXT DATA FOR TRAINING END-TO-END SPOKEN LANGUAGE UNDERSTANDING SYSTEMS

(71) Applicant: International Business Machines Corporation, Armonk, NY (US)

(72) Inventors: Hong-Kwang Jeff Kuo, Pleasantville, NY (US); Yinghui Huang, New York, NY (US); Samuel Thomas, White Plains, NY (US); Kartik Audhkhasi, White Plains, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/841,787

(22) Filed: Apr. 7, 2020

(65) Prior Publication Data
US 2021/0312906 A1    Oct. 7, 2021

(51) Int. Cl.
*G10L 15/06*   (2013.01)
*G10L 15/16*   (2006.01)
*G10L 15/00*   (2013.01)
*G10L 15/26*   (2006.01)

(52) U.S. Cl.
CPC .......... *G10L 15/063* (2013.01); *G10L 15/005* (2013.01); *G10L 15/16* (2013.01); *G10L 15/26* (2013.01)

(58) Field of Classification Search
CPC ..... G10L 15/063; G10L 15/005; G10L 15/16; G10L 15/26
See application file for complete search history.

(56) References Cited

U.S. PATENT DOCUMENTS

| 7,634,406 | B2 | 12/2009 | Li et al. | |
| 11,107,462 | B1* | 8/2021 | Fuegen | G10L 15/22 |
| 2017/0372200 | A1* | 12/2017 | Chen | G10L 15/22 |
| 2018/0358005 | A1 | 12/2018 | Tomar et al. | |

OTHER PUBLICATIONS

Lugosch, Loren, et al. "Using Speech Synthesis to Train End-to-End Spoken Language Understanding Models." arXiv preprint arXiv:1910.09463 (2019) (Year: 2019).*

(Continued)

*Primary Examiner* — Paras D Shah
*Assistant Examiner* — Keisha Y. Castillo-Torres
(74) *Attorney, Agent, or Firm* — Anthony Curro; Otterstedt & Kammer PLLC

(57) ABSTRACT

An illustrative embodiment includes a method for training an end-to-end (E2E) spoken language understanding (SLU) system. The method includes receiving a training corpus comprising a set of text classified using one or more sets of semantic labels but unpaired with speech and using the set of unpaired text to train the E2E SLU system to classify speech using at least one of the one or more sets of semantic labels. The method may include training a text-to-intent model using the set of unpaired text; and training a speech-to-intent model using the text-to-intent model. Alternatively or additionally, the method may include using a text-to-speech (TTS) system to generate synthetic speech from the unpaired text; and training the E2E SLU system using the synthetic speech.

8 Claims, 8 Drawing Sheets

(56) References Cited

OTHER PUBLICATIONS

Coucke, Alice, et al. "Snips voice platform: an embedded spoken language understanding system for private-by-design voice interfaces." arXiv preprint arXiv:1805.10190 (2018). (hereinafter referred to as Coucke et al.) (Year: 2018).*
Serdyuk et al., "Towards End-to-end Spoken Language Understanding", 2018 IEEE International Conference on Acoustics, Speech and Signal Processing (ICASSP), Apr. 2018, pp. 5754-5758, https://ieeexplore.ieee.org/document/8461785.
Qian et al., "Exploring ASR-free end-to-end modeling to improve spoken language understanding in a cloud-based dialog system", 2017 IEEE Automatic Speech Recognition and Understanding Workshop (ASRU). Dec. 2017, pp. 569-576, https://ieeexplore.ieee.org/document/8268987.
Chen et al., "Spoken Language Understanding Without Speech Recognition", 2018 IEEE International Conference on Acoustics, Speech and Signal Processing (ICASSP), Apr. 2018, pp. 6189-6193, https://ieeexplore.ieee.org/document/8461718.
Ghannay et al., "End-To-End Named Entity And Semantic Concept Extraction From Speech", 2018 IEEE Spoken Language Technology Workshop (SLT), Dec. 2018, pp. 692-699, https://ieeexplore.ieee.org/document/8639513.
Lugosch et al., "Speech model pre-training for end-to-end spoken language understanding", Interspeech 2019, Sep. 2019, pp. 814-818, https://www.isca-speech.org/archive/Interspeech_2019/pdfs/2396.pdf.
Haghani et al., "From audio to semantics: Approaches to end-to-end spoken language understanding", 2018 IEEE Spoken Language Technology Workshop (SLT), Dec. 2018, pp. 720-726, https://ieeexplore.ieee.org/document/8639043.
Caubrière et al., "Curriculum-Based Transfer Learning for an Effective End-to-End Spoken Language Understanding and Domain Portability", Interspeech 2019, Sep. 2019, pp. 1198-1202, https://www.isca-speech.org/archive/Interspeech_2019/pdfs/1832.pdf.
Goel et al., "Language model estimation for optimizing end-to-end performance of a natural language call routing system", 2005 IEEE International Conference on Acoustics, Speech and Signal Processing (ICASSP), Mar. 2005, vol. 1, pp. 565-568, https://ieeexplore.ieee.org/document/8639043.
Yaman et al., "An Integrative and Discriminative Technique for Spoken Utterance Classification", IEEE Transactions on Audio, Speech, and Language Processing, vol. 16, No. 6, Aug. 2008, pp. 1207-1214, https://ieeexplore.ieee.org/document/4566089.
Qian et al., "From Speech Signals to Semantics—Tagging Performance at Acoustic, Phonetic and Word Levels", 2018 11th International Symposium on Chinese Spoken Language Processing (ISCSLP), Nov. 2018, pp. 280-284, https://ieeexplore.ieee.org/document/8706581.
Tomashenko et al., "Investigating Adaptation and Transfer Learning for End-to-End Spoken Language Understanding from Speech", Interspeech 2019, Sep. 2019, pp. 824-828, https://www.isca-speech.org/archive/Interspeech_2019/pdfs/2158.pdf.
Bhosale et al., "End-to-End Spoken Language Understanding: Bootstrapping in Low Resource Scenarios", Interspeech 2019, Sep. 2019, pp. 1188-1192, https://www.isca-speech.org/archive/Interspeech_2019/pdfs/2366.pdf.
Graves et al., "Connectionist Temporal Classification: Labelling Unsegmented Sequence Data with Recurrent Neural Networks", 23rd international Conference on Machine Learning (ICML '06), Jun. 2006, pp. 369-376, https://dl.acm.org/doi/abs/10.1145/1143844.1143891.
Devlin et al., "BERT: Pre-training of Deep Bidirectional Transformers for Language Understanding", 2019 Annual Conference of the North American Chapter of the Association for Computational Linguistics: Human Language Technologies (NAACL-HLT), Jun. 2019, vol. 1, pp. 4171-4186, https://www.aclweb.org/anthology/N19-1423.pdf.
Radford et al., "Language Models are Unsupervised Multitask Learners", OpenAI Blog, Feb. 19, 2019, 24 pages, https://cdn.openai.com/better-language-models/language_models_are_unsupervised_multitask_learners.pdf.
Ngiam et al., "Multimodal Deep Learning", 28th International Conference on Machine Learning (ICML 2011), Jun. 2011, pp. 689-696, https://icml.cc/2011/papers/399_icmlpaper.pdf.
Andrew et al., "Deep Canonical Correlation Analysis", 30th International Conference on Machine Learning (ICML 2013), Proceedings of Machine Learning Research (PMLR), vol. 28, No. 3, Jun. 2013, pp. 1247-1255, http://proceedings.mlr.press/v28/andrew13.pdf.
Wang et al., "On Deep Multi-View Representation Learning", 32nd International Conference on Machine Learning (ICML 2015), Proceedings of Machine Learning Research (PMLR), vol. 34, Jun. 2015, pp. 1083-1092, http://proceedings.mlr.press/v37/wangb15.pdf.
Harwath et al., "Jointly Discovering Visual Objects and Spoken Words from Raw Sensory Input," 15th European Conference on Computer Vision (ECCV), Proceedings Part VI, Lecture Notes in Computer Science (LNCS) vol. 11210, Sep. 2018, pp. 649-665, https://link.springer.com/chapter/10.1007/978-3-030-01231-1_40.
Audhkhasi et al., "Forget a Bit to Learn Better: Soft Forgetting for CTC-Based Automatic Speech Recognition", Interspeech 2019, Sep. 2019, pp. 2618-2622, https://www.isca-speech.org/archive/Interspeech_2019/pdfs/2841.pdf.
Kurata et al., "Guiding CTC Posterior Spike Timings for Improved Posterior Fusion and Knowledge Distillation", Interspeech 2019, Sep. 2019, pp. 1616-1620, https://www.isca-speech.org/archive/Interspeech_2019/pdfs/1952.pdf.
Saon et al., "Sequence Noise Injected Training for End-to-end Speech Recognition", 2019 IEEE International Conference on Acoustics, Speech and Signal Processing (ICASSP), May 2019, pp. 6261-6265, https://ieeexplore.ieee.org/document/8683706.
Park et al., "SpecAugment: A Simple Data Augmentation Method for Automatic Speech Recognition", Interspeech 2019, Sep. 2019, pp. 2613-2617, https://www.isca-speech.org/archive/Interspeech_2019/pdfs/2680.pdf.
Wolf et al., "HuggingFace's Transformers: State-of-the-art Natural Language Processing", Oct. 16, 2019, 11 pages, https://arxiv.org/pdf/1910.03771v3.pdf.
Kons et al., "High Quality, Lightweight and Adaptable TTS Using LPCNet", Interspeech 2019, Sep. 2019, pp. 176-180, https://www.isca-speech.org/archive/Interspeech_2019/pdfs/2680.pdf.
Valin et al., "LPCNET: Improving Neural Speech Synthesis through Linear Prediction", 2019 IEEE International Conference on Acoustics, Speech and Signal Processing (ICASSP), May 2019, pp. 5981-5895, https://ieeexplore.ieee.org/document/8682804.
Veaux et al., "The Voice Bank Corpus: Design, Collection and Data Analysis of a Large Regional Accent Speech Database", 2013 International Conference on Oriental Speech Database and Assessments / Conference on Asian Spoken Language Research and Evaluation (O-COCOSDA/CASLRE), Nov. 2013, pp. 225-228, https://ieeexplore.ieee.org/document/6709856.
Zen et al., "LibriTTS: A Corpus Derived from LibriSpeech for Text-to-Speech", Interspeech 2019, Sep. 2019, pp. 1526-1530, https://www.isca-speech.org/archive/Interspeech_2019/pdfs/2441.pdf.
Lugosch et al., "Using Speech Synthesis to Train End-to-End Spoken Language Understanding Models", Oct. 21, 2019, 5 pages, https://arxiv.org/pdf/1910.09463v1.pdf.
Rathi et al., "STDP-Based Unsupervised Multimodal Learning With Cross-Modal Processing in Spiking Neural Network", IEEE Transactions on Emerging Topics in Computational Intelligence (Early Access), Oct. 5, 2018, pp. 1-11, https://ieeexplore.ieee.org/document/8482490.
Peura, "What is Speechly", Nov. 3, 2019, 8 pages, http://www.speechly.com/blog/what-is-speechly/.
Wu et al., "Mask and Infill: Applying Masked Language Model to Sentiment Transfer", Twenty-Eighth International Joint Conference on Artificial Intelligence (IJCAI-19), Aug. 2019, pp. 5271-5277, https://www.ijcai.org/Proceedings/2019/0732.pdf.

(56) References Cited

OTHER PUBLICATIONS

Gu et al., "Speech Intention Classification with Multimodal Deep Learning", Advances in Artificial Intelligence: 30th Canadian Conference on Artificial Intelligence, Lecture Notes in Computer Science (LNCS) vol. 10233, May 2017, pp. 260-271, https://link.springer.com/chapter/10.1007/978-3-319-57351-9_30.

Gu et al., "Hybrid Attention based Multimodal Network for Spoken Language Classification", 27th International Conference on Computational Linguistics, Aug. 2018, pp. 2379-2390, https://www.aclweb.org/anthology/C18-1201.pdf.

* cited by examiner

| AM | LM | T2I | WER | IntAcc |
|---|---|---|---|---|
| unadapted | unadapted | 20hTrainset | 21.9% | 73.4% |
| 20hTrainset | 20hTrainset | 20hTrainset | 10.5% | 89.7% |
| 2hTrainset | 2hTrainset | 2hTrainset | 11.6% | 82.8% |

FIG. 11

| | 20hTrainset | 2hTrainset |
|---|---|---|
| Cascaded(ASR+T2I) | 89.7% | 82.8% |
| E2E CTC | 89.8% | 82.2% |

FIG. 12

| AM | LM | T2I | WER | IntAcc |
|---|---|---|---|---|
| 2hTrainset | 2hTrainset | 2hTrainset | 11.6% | 82.8% |
| 2hTrainset | 20hTrainset | 20hTrainset | 10.3% | 89.6% |
| 2hTrainset | 2hTrainset | 20hTrainset | 11.6% | 88.9% |

FIG. 13

| Method | IntAcc |
|---|---|
| E2E S2I system trained on 2hTrainset | 82.2% |
| Joint training tying speech/text embeddings | 84.7% |
| Adding synthetic multi-speaker TTS speech | 87.8% |
| Adding synthetic single speaker TTS speech | 87.3% |
| Joint training + adding synthetic speech | 88.3% |
| E2E S2I system trained on 20hTrainset | 89.8% |

FIG. 14

| AM Adaptation Data | Speech-to-Intent Data | Classification Accuracy |
|---|---|---|
| 20h | 20h | 89.8% |
| 2h | 2h+TTS | 88% |
| 0h | TTS(1 speaker) | 76% |
| 0h | TTS(2 speakers) | 77% |
| 0h | TTS(multi-speaker) | 80% |

1500

LEVERAGING UNPAIRED TEXT DATA FOR TRAINING END-TO-END SPOKEN LANGUAGE UNDERSTANDING SYSTEMS

BACKGROUND

The present invention relates to the electrical, electronic and computer arts, and, more particularly, to improvements in spoken language understanding systems.

Spoken language understanding (SLU) systems, such as speech-to-intent (S2I) systems, have traditionally been a cascade of an automatic speech recognition (ASR) system converting speech into text followed by a natural language understanding (NLU) system, such as a text-to-intent (T2I) system, that interprets the meaning, or intent, of the text. Cascaded systems are modular and each component can be optimized separately or jointly (also with end-to-end criteria).

One key advantage of modular components is that each component can be trained on data that may be more abundant. For example, there is a lot of transcribed speech data that can be used to train an ASR model. In comparison, there is a paucity of speech data with intent labels, and intent labels, unlike words, are not standardized and may be inconsistent from task to task. Another advantage of modularity is that components can be re-used and adapted for other purposes, e.g. an ASR service used as a component for call center analytics, closed captioning, spoken foreign language translation, etc.

In contrast, an end-to-end (E2E) SLU system processes speech input directly into intent without going through an intermediate text transcript. In other words, end-to-end speech-to-intent systems directly extract the intent label associated with a spoken utterance without explicitly transcribing the utterance. There are many advantages of end-to-end SLU systems, the most significant of which is that E2E systems can directly optimize the end goal of intent recognition, without having to perform intermediate tasks like ASR.

While end-to-end SLU is an active area of research, currently the most promising results under-perform or just barely outperform traditional cascaded systems. One reason is that deep learning models require a large amount of appropriate training data. Training an end-to-end (E2E) neural network speech-to-intent (S2I) system that directly extracts intents from speech requires large amounts of intent-labeled speech data, which is time consuming and expensive to collect.

Training data for end-to-end SLU is much scarcer than training data for ASR (speech and transcripts) or NLU (text and semantic annotations). End-to-end spoken language understanding systems require paired speech and semantic annotation data, which is typically quite scarce compared to NLU resources (semantically annotated text without speech). In fact, there are many relevant NLU text resources and models (e.g. named entity extraction) and information in the world is mostly organized in text format, without corresponding speech. As SLU becomes more sophisticated, it is important to be able to leverage such text resources in end-to-end SLU models.

Non-parallel data has been used to improve various sub-components of a conventional ASR-based cascaded speech-to-intent system, but these approaches have limited applicability when an E2E system with a single monolithic neural network is being trained. Using a pre-trained ASR model, trained with non-parallel text data for E2E systems, is only useful to construct the layers of the network that help derive a robust speech embedding. The actual intent classification layers of an E2E S2I system are still trained on limited amounts of data, and thus there is a long-felt but unmet need for end-to-end spoken language understanding (e.g., speech-to-intent) techniques which leverage NLU text resources, e.g., text-to-intent training data without speech.

SUMMARY

An illustrative embodiment includes a method for training an end-to-end (E2E) spoken language understanding (SLU) system. The method includes receiving a training corpus comprising a set of text classified using one or more sets of semantic labels but unpaired with speech and using the set of unpaired text to train the E2E SLU system to classify speech using at least one of the one or more sets of semantic labels. The method may include training a text-to-intent model using the set of unpaired text; and training a speech-to-intent model using the text-to-intent model. Alternatively or additionally, the method may include using a text-to-speech (TTS) system to generate synthetic speech from the unpaired text; and training the E2E SLU system using the synthetic speech.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. For example, an illustrative embodiment may advantageously permit end-to-end spoken language understanding (SLU) classifiers to be trained in conditions where there is a limited amount of transcribed speech-to-intent (S2I) data and significantly more text-to-intent (T2I) data. More particularly, an illustrative embodiment allow an end-to-end speech-to-intent model to learn from annotated text data without paired speech, e.g., using T2I data rather than only S2I data. By leveraging pre-trained text embeddings and data augmentation using speech synthesis, an illustrative embodiment can improve the intent classification error rate by over 60% and achieve over 80% of the improvement from paired speech-to-intent data.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 10-14 are tables showing unexpected results produced by an illustrative embodiment of the present invention relative to the closest prior art:

FIG. 10 shows baseline results for conventional cascaded S2I systems where the ASR and T2I models are trained separately;

FIG. 11 compares classification accuracy for conventional cascaded and inventive end-to-end S2I systems;

FIG. 12 shows variations in the intent accuracy of conventional cascaded systems with limited S2I data but extra T2I data;

FIG. 13 shows variations in the intent accuracy of embodiments of the present invention with limited S2I data but extra T2I data;

FIG. 14 shows variations in the intent accuracy of embodiments of the present invention under zero speech resource scenarios;

DETAILED DESCRIPTION

As used herein, natural language understanding (NLU) systems generally refer to systems which predict labels from text (e.g., transcription of an utterance), such as text-to-intent (T2I) systems, while spoken language understanding (SLU) systems generally refer to systems which predict labels from speech (e.g., audio of an utterance), such as speech-to-intent (S2I) systems. In such cases, the desired output are semantic labels which encode the "meaning" of what is spoken, rather than just the words. Although the illustrative embodiments of the present invention discussed herein primarily involve speech-to-intent systems, principles of the present invention are generally applicable to spoken language understanding systems, and therefore may be utilized with reference to labels other than intent, such as semantic entities and/or coreference.

An example of text usable for training in accordance with one or more illustrative embodiments of the present invention, in which semantic entities are labeled in addition to the intent, may include: <INTENT=FLIGHT> I want to travel to <DESTINATION_CITY Boston> from <DEPARTURE_CITY Dallas> <DATE next Thursday> and arrive around <ARRIVAL_TIME nine a.m.>. Illustrative embodiments of the present invention advantageously allow for such text to be used for training even when unpaired with speech. Thus, the aforementioned exemplary text may be utilized for training an SLU (e.g., S2I) model without a recording of a person saying "I want to travel to Boston from Dallas next Thursday and arrive around 9 a.m."

Figure 1:
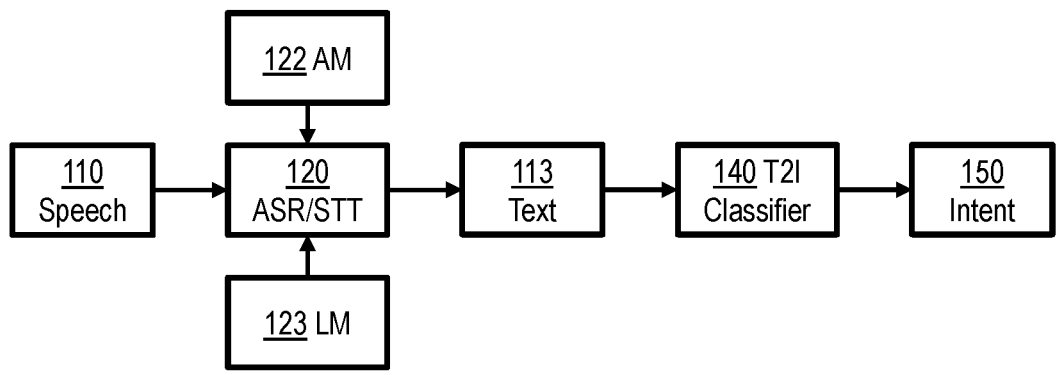
FIG. 1 shows a cascaded speech-to-intent (S2I) system.

FIG. 1 shows a cascaded speech-to-intent (S2I) system 100. Cascaded S2I system 100 receives speech 110 (e.g., an utterance), which is first processed by automatic speech recognition (ASR)/speech-to-text (STT) component 120 to produce text 113 (e.g., a transcription of the speech). ASR/STT 120 may utilize acoustic model (AM) 122 and language model (LM) 123. LM 123, for example, may indicate probabilities, e.g., based on concordance and/or domain, to distinguish between similar-sounding or even identical-sounding words (e.g., homophones and/or homonyms). For example, LM 123 may indicate that, in a system to control amenities in a hotel room, the phrase "I want to sleep" is a more likely or probable transcription than "I want two sheep." Text-to-intent (T2I) classifier 140 may then infer intent 150 from the text 113. For example, a user's speech utterance 110 "I want to sleep," may be converted to text 113 by ASR/STT 120, then interpreted 150 by T2I classifier 140 as expressing an intent 150 such as requesting to dim the lights and/or play a lullaby. In an illustrative embodiment, the ASR/STT 120 could be implemented using Watson Speech to Text and the T2I classifier 140 could be implemented using Watson Assistant, both of which are commercially available from the assignee of the present patent, International Business Machines (IBM).

Figure 2:
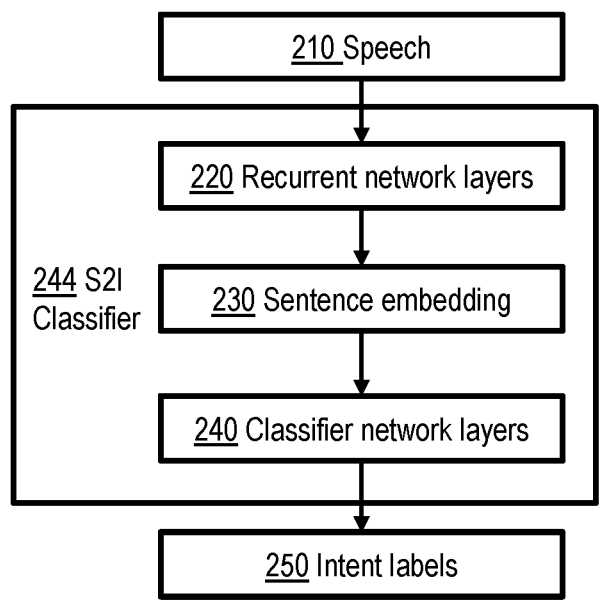
FIG. 2 shows an end-to-end (E2E) S2I system usable with an illustrative embodiment of the present invention.

FIG. 2 shows an end-to-end (E2E) S2I system 200 usable with an illustrative embodiment of the present invention. Like the cascaded S2I system 100, the E2E S2I system 200 can process speech 210 to infer intent labels 250. However, unlike the cascaded S2I system 100, the E2E S2I system 200 does not require the intermediate step of converting the speech to text as discussed above with reference to FIG. 1. Rather, E2E S2I system 210 inputs speech 210 into a unitary S2I classifier 244. Within E2E S2I classifier 244, recurrent network layers 220 process the speech 210 to produce a sentence embedding 230, e.g., a mapping of the spoken utterance 210 to vectors of real numbers. Classifier network layers 240 within E2E S2I classifier 244 then analyzes the sentence embedding 230 to predict or infer intent labels 250 corresponding to speech 210.

In a cascaded S2I system such as 100 in FIG. 1, the ASR/STT 120 and intent classifier 140 are typically trained separately: STT 120 is trained on speech-to-text data (e.g., text paired with speech), while intent classifier 140 is trained on text-to-intent data (e.g., text with intent labels). However, cascaded system 100 does not directly optimize intent classification accuracy, e.g., STT 120 is typically optimized for word error rate. By contrast, in an E2E S2I system such as 200 in FIG. 2, the speech encoder and intent classifier can be jointly optimized for intent classification accuracy. E2E S2I system 200 can train on speech-to-intent data, which could have a lower annotation cost if there is no need to transcribe into words.

Thus, E2E S2I system 200 may be faster than cascaded S2I system 100 because there is no need to decode word sequence. Another advantage of E2E S2I system is that the model may have access to information beyond words, like prosody. However, in many use cases, while natural language processing (NLP) resources such as speech-to-text data and text-to-intent data are plentiful, there is much less speech-to-intent data available. It is not obvious how to exploit text-only data (e.g., labeled text without paired speech) in an E2E SLU system, and embodiments of the invention meet this long-felt need.

End-to-end speech-to-intent systems directly extract the intent label associated with a spoken utterance without explicitly transcribing the utterance. However, it is still useful to derive an intermediate ASR embedding that summarizes the message component of the signal for intent classification. An effective approach to achieve this goal is to train the S2I classifier starting from an pre-trained ASR system. ASR pre-training is also beneficial since intent labels are not required in this step; hence, ASR speech data can be used instead of specific in-domain intent data, which is usually limited. Pre-training on ASR resources is straightforward, and initializing the S2I model with an ASR model trained on copious speech data can alleviate data sparsity.

Figure 3:
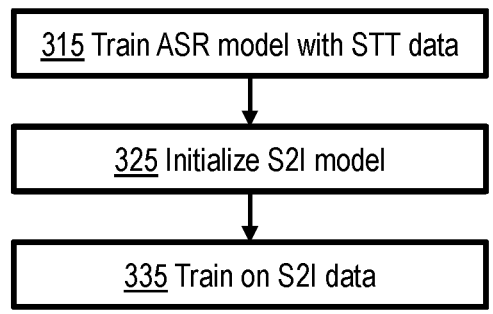
FIG. 3 is a flowchart showing an exemplary transfer learning technique according to an illustrative embodiment of the present invention.

FIG. 3 is a flowchart showing an exemplary transfer learning technique 300 according to an illustrative embodiment of the present invention. In step 315, a speech recognition model is trained with speech-to-text data (e.g., text paired with speech, but not necessarily labeled). An illustrative embodiment may use a phone-based connectionist temporal classification (CTC) acoustic model (AM) trained on general speech data as the base ASR system. See, e.g., Graves et al., "Connectionist Temporal Classification: Labelling Unsegmented Sequence Data with Recurrent Neural Networks", 23rd international Conference on Machine Learning (ICML '06), June 2006, pp. 369-376, incorporated by reference herein.

The ASR model is pre-trained by initially training on large amounts of general speech data (usually readily available), then fine-tuning on domain-specific speech data (often a scarcer resource) augmented by signal processing methods such as speed and tempo perturbation. These steps make the ASR work well for the new domain and its operating conditions (e.g., company-specific telephony channel, codecs, etc.) Employing data augmentation techniques for end-to-end acoustic model training, namely speed and tempo perturbation, improves robustness of the underlying speech model.

In step 325, the S2I model is initialized with this CTC acoustic model and adapted to the in-domain data. In step 335, once the adapted ASR system is trained, it is modified for intent classification using speech that was transcribed and also annotated with intent labels. Thus, the ASR model is used in step 325 to seed or initialize the S2I model, and the S2I model is then trained in step 335 using any available speech-to-intent data.

Figure 4:
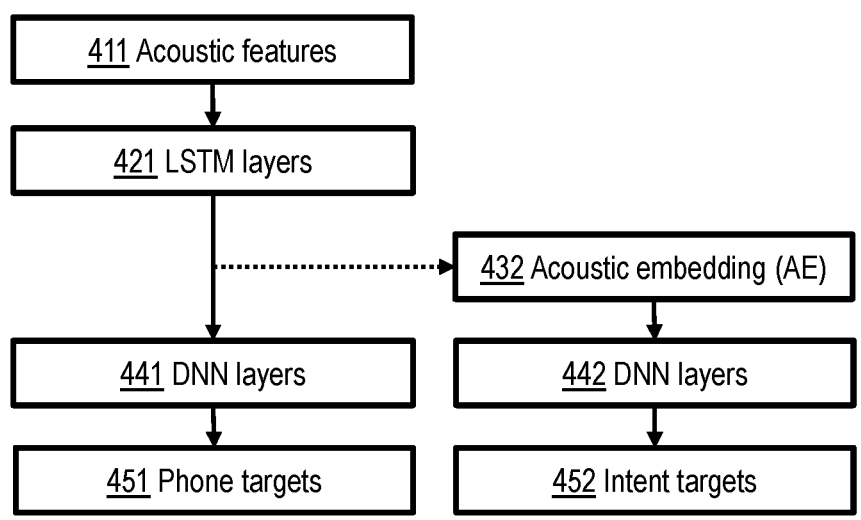
FIG. 4 is a combined block/flow diagram depicting an exemplary S2I system with pre-trained ASR according to an illustrative embodiment of the present invention.

FIG. 4 is a combined block/flow diagram depicting an S2I system 400 with pre-trained ASR according to an illustrative embodiment of the present invention. Acoustic features 411 may be fed through a series of long short-term memory (LSTM) layers 421 followed by a deep neural network (DNN) classification layer 441 that predicts phone targets 451. LSTM layers 421 may be pre-trained as discussed above with reference to step 315 in FIG. 3.

To construct the intent recognition system in FIG. 4, the model is modified by adding a classification layer 442 that predicts intent targets 452. Unlike phone targets 451 which are predicted by the ASR system 441 at the frame level, intent targets 452 span larger contexts. For example, one can assume that each training utterance corresponds to a single intent, although it might be composed of several words.

To better capture intents at the utterance level, an acoustic embedding (AE) 432 corresponding to each training utterance is derived. This embedding 432 is computed by time averaging all the hidden states of the final LSTM layer 421 to summarize the utterance 411 into one compact vector that is used to predict the final intent. The final fully connected layer 442 introduced in this step to process the acoustic embeddings 432 can be viewed as an intent classifier.

While training the network 442 to predict intent 452, given that transcripts for the utterances are also available, the network's prediction 441 of ASR targets 451 is refined as well. With this multi-task objective, the network adapts its layers to the channel and speakers of the in-domain data. During test time, only the outputs 452 of the intent classification layer 442 are used, while the output 451 of the ASR branch 141 is discarded.

Figure 5:
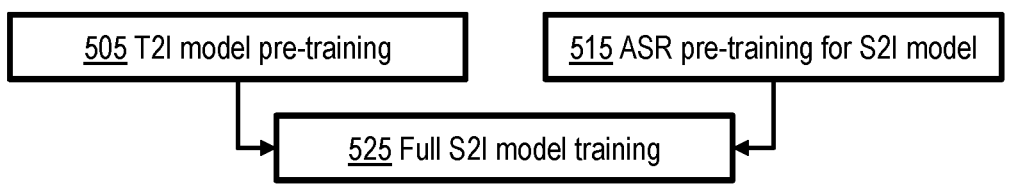
FIG. 5 is a flowchart showing an exemplary joint training technique according to an illustrative embodiment of the present invention.

FIG. 5 is a flowchart showing an exemplary joint training technique 500 according to an illustrative embodiment of the present invention. Leveraging text embedding from models pre-trained on large amounts of data can improve performance in a number of NLU tasks. As used herein, pre-training generally involves training a different type of model (e.g., ASR or NLU), then using the parameters in that model to initialize or influence the final model (e.g., SLU).

In embodiments of the present invention, text embeddings can be used to transfer knowledge (e.g., intent) from labeled text data into a speech-to-intent system, or more generally from a text-based NLU task (e.g., T2I) to an E2E SLU task (e.g., S2I). The text embeddings (TE) are used to "guide" acoustic embeddings (AE) which are trained with a limited amount of S2I data, in the same spirit as learning a shared representation between models. That is to say, acoustic embeddings for intent classification are tied to fine-tuned text embeddings and used to train the intent classifier.

The illustrative embodiments described herein primarily utilize BERT as described in, e.g., Devlin et al., "BERT: Pre-training of Deep Bidirectional Transformers for Language Understanding", 2019 Annual Conference of the North American Chapter of the Association for Computational Linguistics: Human Language Technologies (NAACL-HLT), June 2019, vol. 1, pp. 4171-4186 (hereinafter "Devlin"), which is incorporated by reference herein. However, embodiments of the invention could employ other techniques such as GPT-2 as described in, e.g., Radford et al., "Language Models are Unsupervised Multitask Learners", OpenAI Blog, Feb. 19, 2019, 24 pages, which is incorporated by reference herein.

Training the SLU (e.g., S2I) model according to process 500 includes step 505 with text-based NLU (e.g., T2I) model pre-training. As described in Devlin, BERT is a language model (LM) trained on huge amounts of domain-independent text. In step 505, the BERT LM is adapted to in-domain (e.g., domain-specific) text. BERT is fine-tuned on the available text-to-intent data using a masked LM task as the intermediate task. The model is further fine-tuned with intent labels as the target classification task before the representation of the special token [CLS] is used as the text embedding of an utterance. Thus, the initial BERT model is modified and a T2I classifier is trained so that it can produce intent outputs.

Step 515 of process 500 may be executed in parallel with step 505. Step 515 includes ASR pre-training for S2I model as described above with reference to FIG. 3, in which the base ASR model is trained on non-parallel ASR data (e.g., speech paired with text transcriptions) and subsequently adapted using an augmented S2I data set (e.g., speech labeled with intent). This step adapts the model to the acoustic conditions of the intent data to extract better acoustic embeddings. Next, multi-task training further fine-tunes the acoustic model to generate embeddings that are better for intent classification. Steps 505 and 515 produce an initial S2I system that has seen only limited novel intent content.

Process 500 concludes in step 525 with full S2I model training. In step 525, the final S2I classifier is assembled by combining the fine-tuned T2I classifier from step 505 and the pre-trained S2I system from 515. Unlabeled text can be used in steps 515 and 525 to pretrain the ASR and BERT, but training the final S2I classifier in step 525 generally requires labeled data. A fully connected layer can be added before the classifier to ensure the dimensions of the acoustic embedding and text embedding match for joint-training. Then, the fine-tuned BERT model is jointly trained with the pre-trained ASR acoustic model in order to leverage the knowledge extracted from larger amounts of text data to improve the quality of the acoustic embedding for intent classification.

Figure 6:
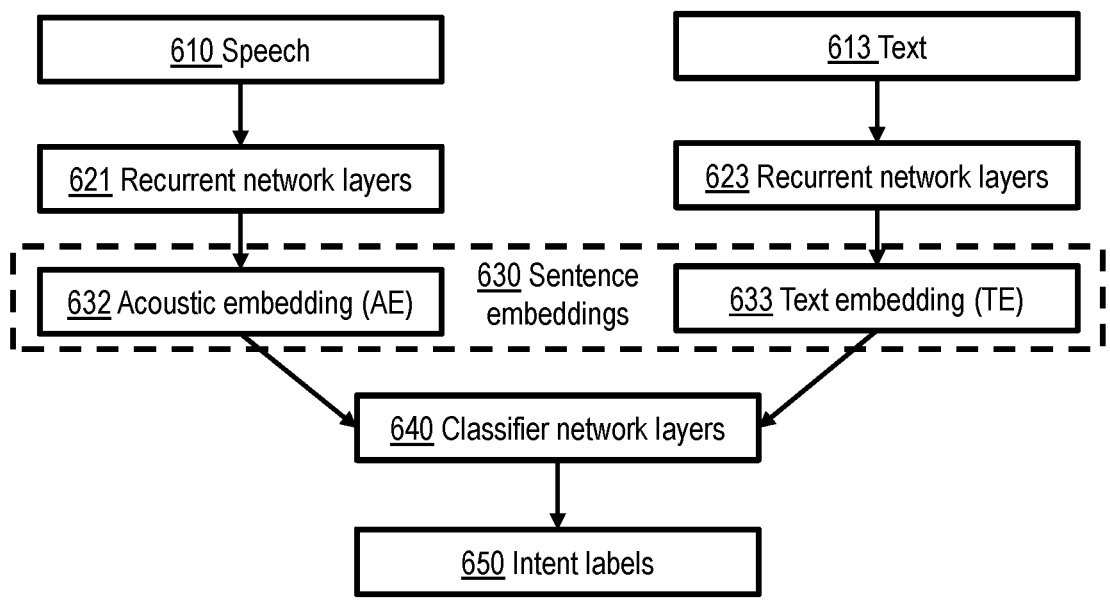
FIG. 6 is a combined block/flow diagram showing an exemplary SLU system with joint training according to an illustrative embodiment of the present invention.

FIG. 6 is a combined block/flow diagram showing an exemplary SLU system 600 with joint training according to an illustrative embodiment of the present invention. Both speech (e.g., audio of an utterance) 610 and paired text (e.g., a transcription of the audio) 613 (which, during training, have known labels) are processed by respective recurrent network layers to produce sentence embeddings 630. Thus, speech 610 is processed by recurrent network layers 621 to produce acoustic embedding (AE) 632, in a manner similar to that discussed above with reference to elements 421 and 432 above with reference to FIG. 4. Text 613 is processed by recurrent network layers 623 to produce text embedding 633. The sentence embeddings 630 (e.g., acoustic embedding 632 and text embedding 633) are then processed by shared (e.g., joint) classifier network layers 640 to predict and/or infer intent labels 650 (which, during training, are compared to the aforementioned known labels for the paired text and speech).

Figure 7:
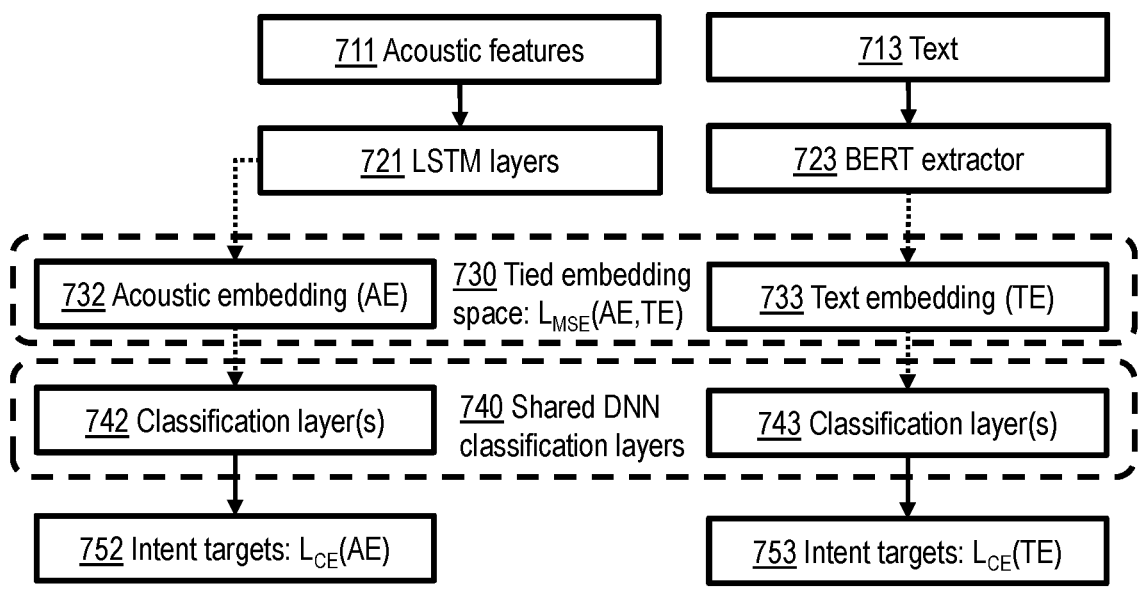
FIG. 7 is a combined block/flow diagram showing an exemplary SLU system with joint training according to an illustrative embodiment of the present invention.

FIG. 7 is a combined block/flow diagram showing an exemplary SLU system with joint training 700 according to an illustrative embodiment of the present invention. The system 700 shown in FIG. 7 may be utilized in connection with step 525 shown in FIG. 5. Elements 711, 721, 732, 742, and 752 in FIG. 3 correspond generally to elements 411, 421, 432, 442, and 452 discussed above with reference to FIG. 4, as well as elements 610, 621, 632, 640, and 650 in FIG. 6. Likewise, elements 713, 723, 733, 743, and 753 correspond generally to elements 613, 623, 633, 640, and 650 discussed above with reference to FIG. 6.

Using reference text 713 as input, text embeddings (TE) 733 are extracted from the BERT model 723. As discussed above with reference to step 505, the BERT-based classifier 723 is trained on labeled text (which need not be paired with speech). Acoustic embeddings (AE) 732 are also extracted in parallel (by LSTM layers 721) from a corresponding acoustic signal 711 (e.g., speech paired with reference text 713). As discussed above with reference to step 215, the ASR model 721 can be trained with speech data that is paired but not necessarily labeled.

A fully-connected layer within the tied embedding space 730 ensures that the embeddings 732, 333 have matching dimensions. These two embeddings 732, 733 are used to train a deep neural network classifier 740 comprising shared classification layers 742 and 743 with identical parameters, initialized from the text-only classification task described above with reference to step 505 in FIG. 5. Given that the text embedding 733 comes from a well-trained extractor 723, the acoustic embeddings 732 are explicitly forced to match the better text embeddings 733. This matching also allows the shared classifier 740 to train better. During test time, only the acoustic branch 742 is used for intent inference 752.

As discussed above with reference to step 505, BERT-based classifier 723 is pre-trained on labeled text, and the resulting text embedding 733 is used to influence final training of S2I model 740. Likewise, as discussed above with reference to step 515, ASR model 721 is pre-trained with speech data that isn't necessarily in-domain, then in-domain labeled data is used to train both branches shown in 700 (e.g., 721 and 723, as well as 742 and 743 within 740).

To achieve these goals, a training procedure that optimizes two separate loss terms is employed. The first loss term corresponds to a composite cross-entropy intent classification loss derived by using the text embeddings, $L_{CE}$ (TE), and the acoustic embeddings, $L_{CE}$(AE), separately to predict intent labels 752, 753 using the shared classifier layer 740. In the combined classification loss, the text-embedding classification loss is scaled by a weight parameter α. The second loss is the mean squared error (MSE) loss between the text embedding and acoustic embedding $L_{MSE}$(AE; TE). It is important to note that while the gradients from the combined classification loss are propagated back to both the text and acoustic embedding networks, the MSE loss is only back-propagated to the acoustic side because the acoustic embeddings presumably should correspond closely to the BERT embeddings, which have been trained on massive quantities of text and perform better on intent classification. On the speech branch 742 the minimized loss is $L_{MSE}$(AE; TE)+$L_{CE}$(AE)+α$L_{CE}$(TE), while the loss on the text branch 743 is $L_{CE}$(AE)+α$L_{CE}$(TE).

Thus, illustrative embodiments provide joint training of E2E SLU (e.g., S2I) and NLU (e.g., T2I) where acoustic/speech embedding (AE) and text embedding (TE) are encouraged to be close through an MSE loss, along with cross-entropy loss for each branch (e.g., for the E2E SLU and for the NLU). For example, an illustrative embodiment may include joint training of the SLU (e.g., S2I) model with BERT-based text embeddings. One encoder (e.g., 621 and/or 721) may be trained to produce speech embeddings (e.g., 632 and/or 732), and another encoder (e.g., 623 and/or 723) may be trained to produce text embeddings (e.g., 633 and/or 733). A loss term can then encourage embeddings (e.g., 630 and/or 730) with the same intent labels (e.g., 650, 752 and/or 753) to be close to each other, so that a single intent classifier (e.g., 640 and/or 740) can be used.

Figure 8:
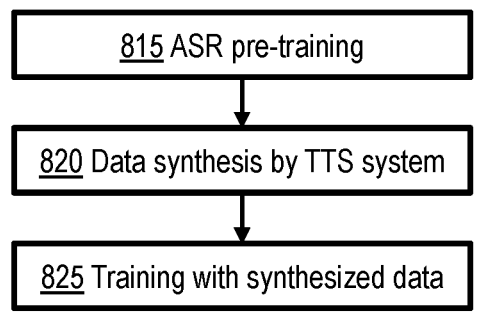
FIG. 8 is a flowchart showing an exemplary data augmentation technique according to an illustrative embodiment of the present invention.
Figure 9:
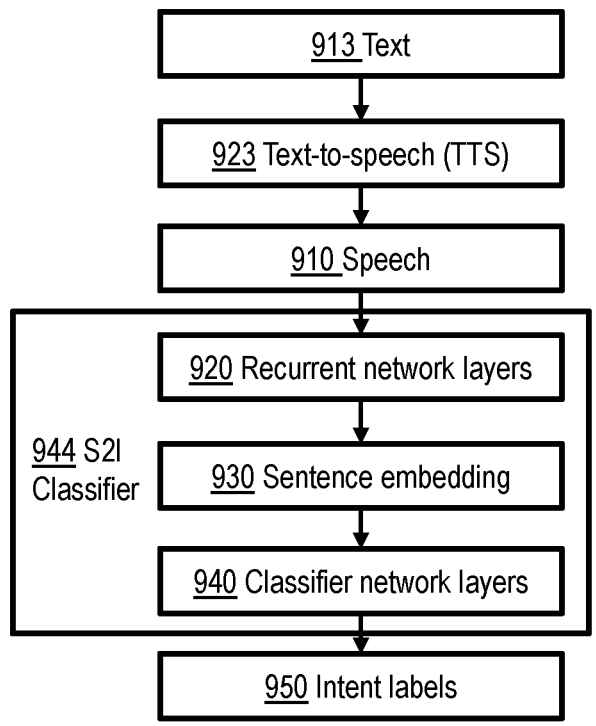
FIG. 9 is a combined block/flow diagram showing an exemplary SLU system with data augmentation according to an illustrative embodiment of the present invention.

Instead of using available labeled text data for pre-training the T2I system as discussed above with reference to FIGS. 3-7, the illustrative embodiments shown in FIGS. 8 and 9 use the text data for speech augmentation, in which the labeled text (e.g. T2I) data is converted into synthetic speech (e.g., S2I) data using a text-to-speech (TTS) system. Thus, the embodiments shown in FIGS. 8 and 9 generate synthetic speech from the unpaired text, such that the original unpaired (but labeled) text is now paired with the synthetic speech: the resulting paired (and labeled) text and speech can then be used to train the E2E SLU (e.g., S2I) system.

FIG. 8 is a flowchart showing an exemplary speech data augmentation technique 800 according to an illustrative embodiment of the present invention. To train the S2I classifier, technique 800 begins in step 815 with ASR pre-training, in which the base ASR model (trained on non-parallel ASR data) is adapted using the speech portion of the S2I data set, in a manner similar to that discussed above with reference to step 515 in FIG. 2.

In step 820, the text data is converted to speech using a TTS system. As will be further discussed below, illustrative embodiments of the present invention can utilize either a single-speaker TTS system as described in Kons et al., "High Quality, Lightweight and Adaptable TTS Using LPCNet", Interspeech 2019, September 2019, pp. 176-180 (hereinafter "Kons") or a multi-speaker TTS system as described in, e.g., Lugosch et al., "Using Speech Synthesis to Train End-to-End Spoken Language Understanding Models", Oct. 21, 2019, 5 pages Lugosch (hereinafter "Lugosch"), both of which are incorporated by reference herein.

In step 825, the TTS-synthesized data from step 820 is used along with the limited amount of original speech (e.g., S2I) data from step 815 for training. Thus, step 825 in FIG. 8 generally corresponds to step 525 in FIG. 5. However, compared with tying text and acoustic embeddings as discussed above with reference to FIG. 5, S2I data augmentation as shown in FIG. 8 might be more effective at training the "embedding" to intent classifier layers of the neural network (e.g., 640 and/or 740), because novel (utterance, intent) pairs are used in the final training phase rather than just in pre-training.

FIG. 9 shows an E2E S2I system 900 with speech data augmentation according to an illustrative embodiment of the present invention. Elements 910, 920, 930, 940, 944, and 950 in FIG. 9 correspond to elements 210, 220, 230, 240, 244, and 250 discussed above with reference to FIG. 9. Text 913 is converted into synthetic speech 910 by TTS 923 as discussed above with reference to step 820 in FIG. 8. Speech 910, including both this synthetic speech and any original speech data, is then used to train the S2I classifier 944 as discussed above with reference to step 825 in FIG. 8.

The inventors implemented illustrative embodiments of the present invention and performed experiments which demonstrated unexpectedly superior results relative to the closest prior art, as shown in FIGS. 10-14. The experiments were performed on a corpus consisting of call center recordings of open-ended first utterances by customers describing the reasons for their calls. See, e.g., Goel et al., "Language model estimation for optimizing end-to-end performance of a natural language call routing system", 2005 IEEE International Conference on Acoustics, Speech and Signal Processing (ICASSP), March 2005, vol. 1, pp. 565-568, which is incorporated by reference herein.

The 8 kHz telephony speech data was manually transcribed and labeled with correct intents. The corpus contains real customer spontaneous utterances, not crowdsourced data of people reading from a script, and includes a variety of ways customers naturally described their intent. For example, the intent "BILLING" includes short sentences such as "billing" and longer ones such as "i need to ask some questions on uh to get credit on an invoice adjustment."

The training data consists of 19.5 hours of speech that was first divided into a training set of 17.5 hours and a held-out set of 2 hours. The held-out set was used during training to track the objective function and tune certain parameters like the initial learning rate. In addition to the 17.5-hour full speech resource training set (referred to herein as 20hTrainset, containing 21849 sentences, 145K words), a 10% subset (1.7 h) was extracted for low speech resource experiments (referred to herein as 2hTrainset, containing 2184 sentences, 14K words). The training data was augmented via speed and tempo perturbation (0.9× and 1.1×), so 2hTrainset finally contains about 8.7 hours and 20hTrainset about 88 hours of speech. The devset consists of 3182 sentences (2.8 hours) and was used for hyperparameter tuning, e.g., tuning the acoustic weight to optimize the word error rate (WER). A separate data set containing 5592 sentences (5 h, 40K words) was used as the final testset.

In the training set, each sentence had a single intent, and there were 29 intent classes. The testset contains additional unseen intent classes and multiple intents per sentence, as naturally happens in real life. For simplicity, the experimental results herein always counted such sentences as errors when calculating intent accuracy; they account for about 1% of the utterances. The testset has an average of 7 words per utterance, with the longest sentence being over 100 words long. 70% of the sentences are unique (not repetitions).

When implementing the ASR CTC model discussed above with reference to FIG. 4, the ASR system, including the baseline acoustic model (AM) and language model (LM), was pre-trained on the 300-hour Switchboard English conversational speech corpus. The AM is a 6-layer bidirectional LSTM network with every layer containing 640 LSTM units per direction. A dropout probability of 0.5 was used on the LSTM output at each layer.

The AM is trained using CTC loss over 44 phones and the blank symbol. First, speed and tempo perturbation (0.9× and 1.1×) were performed, resulting in a 1500-hour audio data set. Then, the AM was trained for 20 epochs using CTC loss, followed by 20 epochs of soft forgetting training as described in, e.g., Audhkhasi et al., "Forget a Bit to Learn Better: Soft Forgetting for CTC-Based Automatic Speech Recognition", Interspeech 2019, September 2019, pp. 2618-2622, which is incorporated by reference herein. Next were 20 epochs of guided training as described in, e.g., Kurata et al., "Guiding CTC Posterior Spike Timings for Improved Posterior Fusion and Knowledge Distillation", Interspeech 2019, September 2019, pp. 1616-1620, which is incorporated by reference herein.

Throughout the training, on-the-fly data augmentation was provided by using sequence noise injection as described in, e.g., Saon et al., "Sequence Noise Injected Training for End-to-end Speech Recognition", 2019 IEEE International Conference on Acoustics, Speech and Signal Processing (ICASSP), May 2019, pp. 6261-6265, and SpecAugment as described in, e.g., Park et al., "SpecAugment: A Simple Data Augmentation Method for Automatic Speech Recognition", Interspeech 2019, September 2019, pp. 2613-2617, both of which are incorporated by reference herein.

In some embodiments, additional augmentation may include simulating telephony channels and noise effects, such as a random combination of landline or cellular channels with 3 noise levels, such as mimicking channel effects from available speech data. It may also be desirable to include more virtual voices from random combinations of speakers vectors and/or to modify speaking style to get more combinations (e.g., speed and pitch).

The BERT-based T2I model discussed above with reference to FIGS. 6 and 7 started with the pre-trained $BERT_{base}$ model introduced in Devlin, and further described in Wolf et al., "HuggingFace's Transformers: State-of-the-art Natural Language Processing", Oct. 16, 2019, 11 pages, which is incorporated by reference herein. Pre-training used a masked LM target with learning rate 3e-5 for 10 epochs, followed by 3 epochs of fine-tuning on the intent classification task with learning rate 2e-5. This text-to-intent BERT based classifier gives 92.0% accuracy on human-generated reference transcripts.

The TTS system architecture discussed above with reference to FIG. 9 is a modular system based on three neural-net (e.g., DNN) models: one to infer prosody, one to infer acoustic features (e.g., spectral features), and an LPCNet vocoder as described in Valin et al., "LPCNET: Improving Neural Speech Synthesis through Linear Prediction", 2019 IEEE International Conference on Acoustics, Speech and Signal Processing (ICASSP), May 2019, pp. 5981-5895, which is incorporated by reference herein. Some embodiments used a single-speaker TTS system similar to that described in Kons.

Other embodiments used a multi-speaker system in which both the prosody and the acoustic networks were converted to multi-speaker models by conditioning them on a speaker embedding vector (e.g., adding the speaker vector to each DNN model). Each of the three models was independently trained on 124 hours of 16 KHz speech from 163 English speakers. The speaker set is composed of 4 high quality proprietary voices with more than 10 hours of speech, 21 VCTK voices, and 138 LibriTTS voices. VCTK is described in, e.g., Veaux et al., "The Voice Bank Corpus: Design, Collection and Data Analysis of a Large Regional Accent Speech Database", O-COCOSDA/CASLRE 2013 Conference, Gurgaon, India, November 2013, pp. 225-228, and Zen et al., "LibriTTS: A Corpus Derived from LibriSpeech for Text-to-Speech", Interspeech 2019, September 2019, pp. 1526-1530, both of which are incorporated by reference herein. Each sentence was synthesized with the voice of a random speaker selected out of the known speakers set. Finally, the samples were downsampled to 8 KHz to match the S2I audio sampling rate. This generally resulted in high-quality output with high similarity to the original speakers.

FIG. 10 shows baseline results for conventional cascaded S2I systems where the ASR and T2I models are trained separately. As shown in the first row of FIG. 10, using the aforementioned baseline AM and LM trained only on the Switchboard corpus, and a BERT T2I model trained model trained on the domain data 20hTrainset, we obtained 21.9% word error rate (WER) and 73.4% intent classification accuracy (IntAcc) for testset. The same T2I model has 92.0% intent accuracy on human reference transcripts; thus, there is a significant degradation in accuracy with speech input due to ASR errors.

However, when the acoustic, language, and intent classification models were adapted on in-domain data, both WER and intent accuracy dramatically improved, thus producing the strongest possible baseline results to which illustrative embodiments of the present invention could be compared. As shown in the second row of FIG. 10, when the AM and LM of the system (as well as the T2I model) were adapted using the 20hTrainset (e.g., full speech resource scenario), intent accuracy increased from 73.4% to 89.7%, such that there is now only about a 2% accuracy gap between using human transcripts (92.0%) and using ASR outputs (89.7%). In the low-resource scenario, adapting the AM and LM on 2hTrainset and also training T2I on only 2hTrainset results in intent accuracy of 82.8%, as shown in the third row of FIG. 10.

FIG. 11 compares classification accuracy for conventional and inventive systems when paired speech-to-intent data is used. FIG. 11 shows that, when paired speech-to-intent data is used, an illustrative embodiment of the invention utilizing the proposed E2E S2I approach gives comparable accuracy to the state-of-the-art cascaded approach, both with full training data (20hTrainset) or in the low-resource setting (2hTrainset).

In the low-resource scenario where only a limited amount of speech is available (2hTrainset), frequently one may have extra text data with intent labels but no corresponding speech data. For the cascaded system, it is straightforward to train different components (AM, LM, T2I) with whatever appropriate data is available.

FIG. 12 shows how the intent accuracy of cascaded systems with limited speech resources and varying amounts of text-to-intent data. By training the LM and T2I on the 20hTrainset data, the intent accuracy increased to 89.6%, basically matching the best accuracy of 89.7%, where the AM is also adapted on 20hTrainset. The third row in FIG. 12 shows that if only the T2I model (but not the LM) is trained on 20hTrainset, the accuracy is still quite high: 88.9%.

Comparing results from the first and third rows in FIG. 12 shows that the accuracy difference between training the T2I model on 2hTrainset versus 20hTrainset is about 6%, accounting for most of the gap between the full resource and limited resource performance. In other words, the T2I model is the weakest link, the component that is most starved for additional data. For the AM and LM, because they were pre-trained on plenty of general data, even just 2 h of adaptation is almost enough, but the intent classifier needs much more data. This makes sense because the intent classification task can be quite domain specific.

For the end-to-end speech-to-intent system, leveraging the text-to-intent data is not straightforward. If it were unable to take advantage of such data, it would be at a significant 6-7% accuracy disadvantage compared to the cascaded system in this scenario. FIG. 13 shows how embodiments of the present invention leverage extra text data to reduce the gap caused by having less S2I training data. Indeed, illustrative embodiments of the present invention can recover over 80% of performance lost due to using limited intent-labeled speech.

Comparing the first and last rows of FIG. 13 shows that training the E2E S2I system shown in FIG. 1 on 2hTrainset rather than 20hTrainset causes accuracy to drop from 89.8% to 82.2%, as discussed above with reference to FIG. 11. The second row of FIG. 13 shows that joint training end-to-end S2I CTC model with BERT fine-tuned on full T2I data, as discussed above with reference to FIGS. 6 and 7, causes an accuracy improvement from 82.2% to 84.7%.

The third and fourth rows of FIG. 13 demonstrate the technique discussed above with reference to FIG. 8, which involves converting the extra T2I data (20hTrainset) using TTS to create new S2I data, then adding the synthetic data to 2hTrainset to train the E2E model resulted in quite significant improvements in intent accuracy whether the synthetic data was generated using single speaker TTS (87.3%) or multi-speaker TTS (87.8%). This unexpected result was contrary to conventional wisdom at the time of the invention: see, e.g., Lugosch at page 2, left column, last full paragraph ("In the past, we have found that having multiple speakers in the training set is crucial to achieving high test accuracy in end-to-end SLU. We anticipated that this would also be the case when using synthetic speakers.")

Thus, in embodiments of the present invention, the TTS generated data serves primarily to convert the T2I data into a form that the S2I model can process, and the improvement is due to the S2I model learning new semantic information ("embedding"-to-intent) from the new synthetic data rather than adapting to the acoustics. Therefore it is not necessary to generate a lot of variability in the speech (e.g. speakers, etc.) with the TTS data, nor is it necessary to make any attempt to match the telephony channel. One resulting advantage is simplification of implementation in production.

Running ASR on the TTS speech, the WER was very low, around 4%, so there was little mismatch between the TTS speech and the underlying ASR model. One can imagine that the speech encoder portion of the model removes speaker variability, etc. to produce an embedding that depends largely on just the word sequence; hence, any representative TTS speech would be sufficient because the weakest link was the intent classifier.

Finally, the last row of FIG. 13 shows that combining joint training text and speech embeddings discussed above with reference to FIGS. 5-7 with synthetic TTS speech data discussed above with reference to FIGS. 8-9, obtains further gains, resulting in an intent classification accuracy of 88.3%. By leveraging pre-trained text embeddings and data augmentation using speech synthesis, an illustrative embodiment can improve the intent classification error rate by over 60% and achieve over 80% of the improvement from paired speech-to-intent data.

FIG. 14 shows variations in the intent accuracy of embodiments of the present invention under zero speech resource scenarios. In contrast to many of the embodiments discussed above, in which at least some limited amount of labeled speech (e.g., S2I and/or speech paired with T2I) data is available, there may be instances where no such speech resources are available. The first row of results in FIG. 14 shows that an E2E S2I system where a full speech resource (e.g., 20hTrainset) is available for training both the AM and the S2I model results in 89.8% classification accuracy, as previously discussed with reference to the last row in FIG. 13. The second row of results in FIG. 14 shows that where a limited speech resource (e.g., 2hTrainset) is used for training the AM as discussed above with reference to FIGS. 3-4, and where this limited speech resource is augmented using TTS as discussed above with reference to FIGS. 8-9, the accuracy is approximately 88%, which is also consistent with FIG. 13.

The remaining rows of results in FIG. 14 reflect zero speech resource scenarios, where there is no existing speech data available to train the AM or the S2I model, but rather the S2I model is trained using only synthetic speech generated by a TTS as discussed above with reference to FIGS. 8-9. Where only a single speaker TTS is used, the classification accuracy is 76%. Where TTS is used with two speakers, the classification accuracy is 77%. Where TTS is used with multiple speakers (e.g., as discussed above), the classification accuracy is 80%. These results show under zero speech resource scenarios, the acoustic model is the weakest link, e.g., the component that is most starved for additional data.

To recapitulate, embodiments of the present invention use non-parallel text-to-intent data to build and improve spoken language understanding systems, such as speech-to-intent systems. The text-to-intent data may be converted to text embeddings that are in turn used to pre-train a speech-to-intent classifier. More particularly, the text embeddings may be used to initially train a text-to-intent classifier whose layers will be used to initialize a speech-to-text model These text embeddings can be derived from, but not limited to, sentence embeddings or text using pre-trained models such BERT, word2vec, etc.

The speech embeddings can be tied to the text-embeddings to allow the speech-to-intent classifier to learn from better representations. The final speech-to-intent classifier can then be trained and fine-tuned on speech data with intent labels. The training loss used to train the speech-to-intent classifier may be a composite loss function based on the MSE criterion that tries to make the speech and text embedding identical, the classification error of the intent system using text embeddings, and the classification error of the intent system using speech embeddings.

Alternatively or additionally, the text-to-intent data may be converted to speech using a TTS system. The TTS system may be either a single-speaker or multi-speaker system generating either single-speaker synthetic data or multi-speaker synthetic data. The synthetic data can be used to improve the intent classification layers (layers that translate the speech embedding to output intents) of the network with novel semantic information that is otherwise limited in the available original training data. The synthetic data can be combined with real speech-to-intent data to train a speech-to-intent system. The training loss used to train the speech-to-intent system may be a composite loss function based on classification error of the intent sub-task and ASR sub-task.

In one or embodiments, the text-to-intent data is first converted into embeddings that are in turn used to pre-train a speech-to-intent classifier. The text-to-intent data is also converted to speech using a TTS system and then used along with real speech-to-intent data to fine tune the pretrained speech-to-intent classifier. The intermediate pre-trained ASR system may be either a hybrid or an E2E based ASR system, such as a CTC, RNN-T, and/or attention-based system.

One or more embodiments of the invention, or elements thereof, can be implemented, at least in part, in the form of an apparatus including a memory and at least one processor that is coupled to the memory and operative to perform exemplary method steps.

Figure 15:
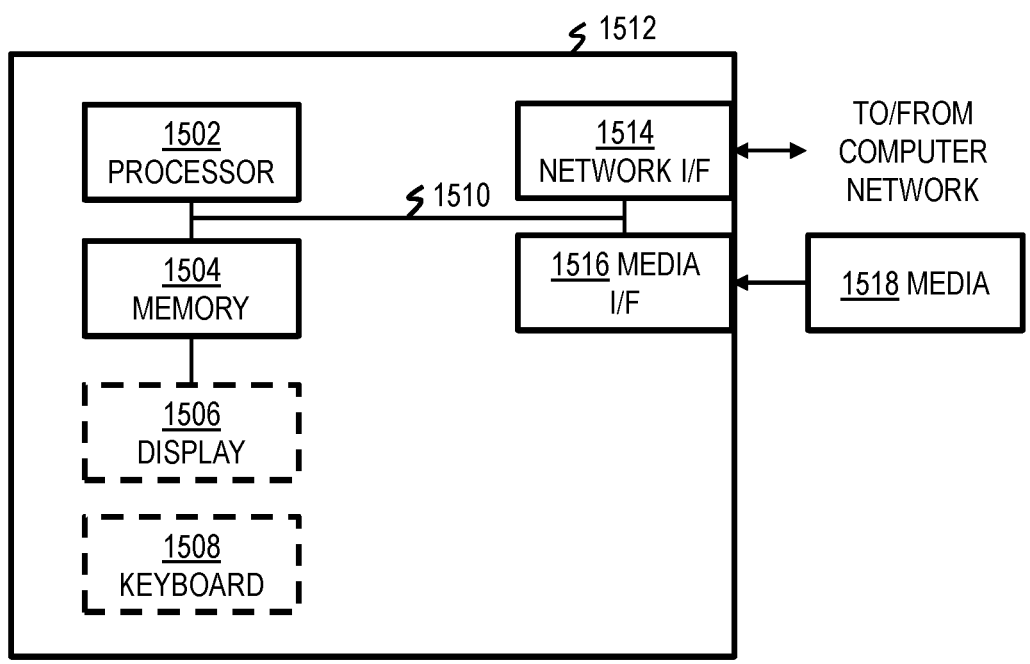
FIG. 15 shows a computer system that may be useful in implementing one or more aspects and/or elements of the invention.

One or more embodiments can make use of software running on a general purpose computer or workstation. With reference to FIG. 15, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1502, memory 1504, and input/output interface such as display 1506 and keyboard 1508 can be interconnected, for example, via bus 1510 as part of a data processing unit 1512. Suitable interconnections, for example via bus 1510, can also be provided to a network interface 1514, such as a network card, which can be provided to interface with a computer network, and to a media interface 1516, such as a diskette or CD-ROM drive, which can be provided to interface with media 1518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1502 coupled directly or indirectly to memory elements 1504 through a system bus 1510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1512 as shown in FIG. 15) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1502. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for training an end-to-end (E2E) spoken language understanding (SLU) system, the method comprising steps of:
    receiving a training corpus comprising a set of text classified using one or more sets of semantic labels but unpaired with speech; and
    using the set of unpaired text to train the E2E SLU system to classify speech using at least one of the one or more sets of semantic labels;
    wherein the spoken language understanding system comprises a speech-to-intent system, and wherein the set of unpaired text comprises text-to-intent data;
    wherein the training corpus further comprises a set of speech, the method further comprising:
        training a text-to-intent (T2I) model using the unpaired text and the labels; and
        training a speech-to-intent (S2I) model using the speech and the labels
    wherein the text-to-intent model and the speech-to-intent model are within a shared deep neural network.

2. A method for training an end-to-end (E2E) spoken language understanding (SLU) system, the method comprising steps of:
    receiving a training corpus comprising a set of text classified using one or more sets of semantic labels but unpaired with speech; and
    using the set of unpaired text to train the E2E SLU system to classify speech using at least one of the one or more sets of semantic labels;
    wherein the training corpus further comprises a set of speech and text paired with at least a portion of the set of speech, the method further comprising:
        training a natural language understanding (NLU) model using the unpaired text and the labels;
        training an automatic speech recognition (ASR) model using the paired text and speech;
        training a spoken language understanding (SLU) model based on a tied embedding space of the NLU model and the ASR model using the paired text, the semantic labels, and speech.

3. The method of claim 2, wherein using the text paired with speech to jointly train comprises:
    using the NLU model to produce a text embedding of the text paired to the speech; and
    using the SLU model to produce an acoustic embedding of the speech paired to the text.

4. The method of claim 3, further comprising:
    determining a mean square error loss between the text embedding and the acoustic embedding; and
    backpropagating the mean square error loss to the SLU model not to the NLU model.

5. The method of claim 3, further comprising:
    using a shared classification layer to derive respective labels from the acoustic embedding and from the text embedding; and backpropagating composite class-entropy classification loss for the respective labels to the SLU model and the NLU model.

6. The method of claim 2, wherein the training of the spoken language understanding (SLU) model further comprises jointly training the NLU model with the training of the SLU model.

7. An apparatus for training an end-to-end (E2E) spoken language understanding (SLU) system, the apparatus comprising:
　a memory; and
　a processor coupled to the memory, the processor being operative:
　　to receive a training corpus comprising a set of text classified using one or more sets of semantic labels but unpaired with speech; and
　　to use the set of unpaired text to train the E2E SLU system to classify speech using at least one of the one or more sets of semantic labels;
　wherein the spoken language understanding system comprises a speech-to-intent system, and wherein the set of unpaired text comprises text-to-intent data;
　wherein the training corpus further comprises a set of speech, the processor being further operative:
　　to train a text-to-intent (T2I) model using the unpaired text and the labels; and
　　to train a speech-to-intent (S2I) model using the speech and the labels;
　wherein the text-to-intent model and the speech-to-intent model are within a shared deep neural network.

8. A computer program product for training an end-to-end (E2E) spoken language understanding (SLU) system, the computer program product comprising a non-transitory machine-readable storage medium having machine-readable program code embodied therewith, said machine-readable program code comprising machine-readable program code configured:
　to receive a training corpus comprising a set of text classified using one or more sets of semantic labels but unpaired with speech; and
　to use the set of unpaired text to train the E2E SLU system to classify speech using at least one of the one or more sets of semantic labels;
　wherein the spoken language understanding system comprises a speech-to-intent system, and wherein the set of unpaired text comprises text-to-intent data;
　wherein the training corpus further comprises a set of speech, the machine-readable program code further configured:
　　to train a text-to-intent (T2I) model using the unpaired text and the labels; and
　　to train a speech-to-intent (S2I) model using the speech and the labels;
　wherein the text-to-intent model and the speech-to-intent model are within a shared deep neural network.

\* \* \* \* \*